Feb. 11, 1930.    W. M. MARTIN    1,746,862
PARACHUTE
Filed May 17, 1929
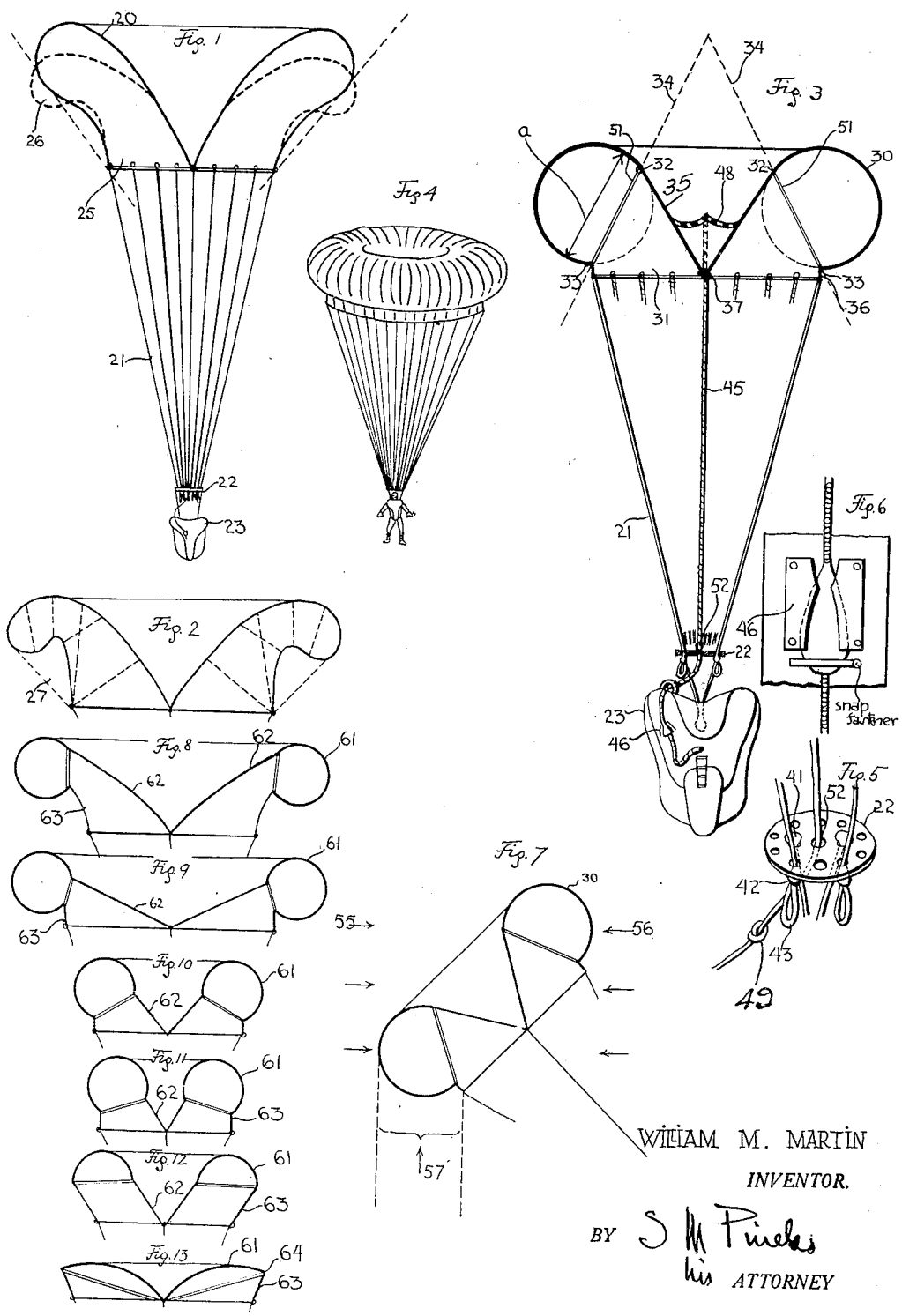
WILLIAM M. MARTIN
INVENTOR.
BY
his ATTORNEY Patented Feb. 11, 1930

1,746,862

UNITED STATES PATENT OFFICE

WILLIAM M. MARTIN, OF NEW YORK, N.,Y., ASSIGNOR TO HUGO RIBBE, OF NEW YORK, N. Y.

PARACHUTE

Application filed May 17, 1929, Serial No. 363,778, and in Germany June 16, 1926.

This invention relates to parachutes, and it has among its objects the provision of an apparatus of this character in which the canopy is so constructed that it remains stable and eliminates the tendency of the parachute to sway on descending downwardly or otherwise moving through the air.

According to my invention, the canopy of the parachute is not made as heretofore in the shape of a more or less dome-like, upwardly convex body, but it has instead the form of an upwardly diverging, hollow wingbody spreading towards opposite sides. This hollow wingbody is open at its narrower lower side, the opening being of such size that on moving the canopy in downward direction, the air pressure acting through the opening into the narrower side of the canopy will keep it in taut condition with the wingbody in the outwardly spread state.

The foregoing and other features of the invention will be best understood from the following description thereof, reference being had to the accompanying drawings wherein Fig. 1 is a cross-sectional view through a parachute apparatus embodying the fundamental principles of my invention;

Fig. 2 is a cross-sectional view through a form of canopy suitable for a parachute such as shown in Fig. 1, illustrating the arrangement of stays or maintaining the canopy in the desired outwardly spread state;

Fig. 3 is a cross-sectional view of a parachute illustrating the preferred form of construction embodying the invention;

Fig. 4 is a perspective view of a descending parachute of a construction such as shown in Fig. 3;

Fig. 5 is a detail view of the tie member of the parachute shown in Fig. 3;

Fig. 6 is a detail view of the mounting of the lower end of the central control cord of the parachute of Fig. 3;

Fig. 7 is a diagrammatic view of the canopy section of a parachute such as shown in Fig. 3, while in inclined position, illustrating the action of the forces in stabilizing the canopy; and, Figs. 8 to 13, inclusive, are diagrammatic cross-sectional views of various forms of canopy constructions embodying the principle of my invention.

The canopies of the parachutes now in general use have the form of an upwardly convex dome or sphere section. Such structure is aerodynamically unstable and if left to itself in the air, it would capsize and descend downwardly with the convex end towards the ground. When such parachute is used only the load of the falling person or other object carried by the parachute keeps it in its normal position. However, the unstabilizing forces acting on the parachute are very large compared to the stabilizing force of the load. As a result, such loaded parachute does not descend straight downwardly in a uniform fall, but the parachute with its load performs a swaying or oscillating movement, and considerable skill is required on the part of the user in order to land from such parachute without damage to himself.

The provision of a central opening in the canopy overcame to a certain extent the tendency of the ordinary dome-shaped canopies to tip over and collapse, but it did not sufficiently overcome the unstabilizing forces acting on such parachutes and failed to remove the incessant, strong swaying movements present in such prior art parachutes.

According to my invention the deficiencies of the prior art parachutes are overcome by making the canopy so that the canopy retains throughout its natural movement through the air, a stable position corresponding in a certain sense to the position of stability of the dome-shaped canopies of prior art parachutes when they drop down in tipped over condition with the convex part pointing downwardly in the direction of the movement. The canopy of my invention is ordinarily arranged so that in its general outline it has a V-shaped contour both on its lower side as well as on its upper side. Such wing-like bodies with the narrower end pointing downwardly are aerodynamically stable, and on being left to themselves will move downwardly under the action of the gravitational forces without substantial swaying movement and with the narrower side remaining permanently on the lower side and without tendency to tip over.

A parachute embodying this principle of my invention is shown in Fig. 1 of the drawings wherein a canopy 20 of flexible material shaped so as to form an outwardly-spreading, laterally-diverging, hollow wingbody carries by means of a plurality of strands 21 secured to the periphery of the opening on the lower side of the canopy, a tie member 22 to which is secured a harness 23 adapted to hold the aviator, or in general the load that is to be carried down by the parachute.

As seen in the drawing, the canopy forms a hollow baglike structure which is kept inflated and taut by the pressure of the air acting through the opening 25 on the lower side of the canopy. This opening 25 is made sufficiently large so that the pressure of the air acting on the interior of the baglike wingbody keeps it in taut condition against the forces which tend to collapse the outwardly diverging parts of the wing structure towards the center. In order to make the canopy such as shown in Fig. 1 maintain its outwardly spread, divergent shape, the canopy should be made of individual parts cut and joined together so that when normally inflated they would assume a shape such as indicated by the dotted lines 26. The action of the air stream on this body would then cause it to turn upwardly and assume the full line position shown in the drawing. It may also be necessary to add to the structure, stay rods or stay cords such as indicated by the dotted lines 27 in Fig. 2, for maintaining the individual parts of the canopy in proper relationship and counteracting the tendency of the outward bulge to be turned inwardly by the action of the air stream.

The essential characteristic of the canopy of my invention as shown in Figs. 1 and 2, is the fact that it has V-shaped or in general upwardly divergent boundary surfaces, thereby securing aerodynamic stability in the movement towards the ground. With such construction, any tipping movement towards one side is immediately counteracted by increased pressure acting on the outer surface of the canopy body, tending to straighten it out into the normal position as shown in Fig. 1. The tendency to tip over present in the prior art canopy structures is entirely eliminated, the parachute remaining always in its normal horizontal position because the air pressure acting on the lower surfaces, and the air suction acting on the upper surfaces exercise a leverage action which always returns the V-shaped body to its normal position, as shown in the drawing.

While canopy structures of the form such as shown in Figs. 1 and 2 can be made to maintain their outwardly divergent bulge by suitably cutting the material forming the body of the canopy, and through the provision of suitable stay or rigging rods or ropes, the use of such rigging means tends to unduly complicate the unfolding of the parachute and renders its use more difficult.

According to my invention, outwardly and upwardly diverging hollow canopies may be made without complicating riggings rods or ropes by using constructions such as shown in Figs. 3, 4, and 8 to 13, inclusive, which are preferred forms of my invention.

As shown in Fig. 3, the outwardly divergent part 30 of the canopy is made in the form of a rotary hose-like, hollow body of circular cross-section. To this annular hollow body is joined the lower and central inlet section 31 along the lines 32, 33, which may be considered to be theoretically the resultants of the intersection of the annulus 30 with the conical intersecting surface indicated by the dotted lines 34. As shown in Fig. 3, the upper wall 35 of the inlet section is in the shape of a cone which merges into the annulus 30 at the circular line 32, and the lower side of the inlet section is in the form of a short cylinder joined to the annulus 30 along the circular line 33. The inner conical surface 35 of the canopy is preferably so arranged that the apex of the cone lies relatively low, for instance, as indicated in the drawing, at the level of the lower edge of the short cylinder forming the outer walls of the inlet section.

The weight of the load is not carried by the apex of the central cone section 35 of the canopy, but by the outer periphery 36 of the short cylindrical inlet wall of the canopy, the carrying strands 21 being suitably distributed along the periphery. The lower ends of these carrying strands are held together by means of a tie member 22 which is shown to be in the form of a disk having a plurality of perforations 41 through which the individual strands may pass, the strands being held in place by suitable knots 42 on the underside of the tie disk 22 so that they would slip through the perforations 41. The lower ends of the carrying strands may also be provided with loops 43 for controlling the direction of the descending movement as explained hereinafter.

In order to maintain the lower point 37 of the central section of the upper canopy wall in its proper position, it has connected thereto a central cord 45 which is threaded through a central perforation to the tie disk 22, and is stably anchored at its lower end on a locking bracket 46 disposed on the harness 23 of the aviator. The end of the central cord 45 held in the bracket 46 is preferably made so as to permit it to be loosened and left out for a limited distance, and for this reason it is held in the bracket 46 by an enlarged knot as shown in detail in Fig. 6, this portion of the cord being adapted to be loosened and pulled out from the bracket and left out. When the cord 45 is left out, the apex 37 of the central cone-shaped part of the upper canopy surface will rise somewhat and assume the shape indicated by the dotted line 48.

The upward movement of the central cord 45 and the upward folding of the central upper canopy portion is limited by a knot 49 on the cord underneath the tie disk 22 so that even when the central upper canopy wall assumes the position shown by the dotted line 48, the general outline of the upper canopy side will still retain its stable V-shape, the central point 37 being still below the upper level of the annulus 30.

The descending parachute may be made to move in one or another direction out of the vertical line of descent by exerting a pull on one or more of the carrying strands 21 through the loops 43 at their lower ends. These loops are arranged so as to be within easy reach of the aviator and by pulling on one or more of the loops of the carrying ropes disposed on one side of the periphery of the canopy, the aviator may cause the parachute to deviate in its downward movement from the vertical direction, and move diagonally in the desired direction.

Through the use of an annulus such as shown in Fig. 3, for forming the outwardly diverging part of the canopy, the canopy will maintain its taut condition without the necessity of using special rigging or bracing rods as with this form of canopy body the maximum space is closed with a minimum of area, so that the air pressure acting on the interior of the annulus will always maintain it in taut, stretched out condition. The width of the lower inlet opening into the canopy is made such that the movement of the canopy through the air produces in the hollow interior of the canopy sufficient pressure to maintain it taut and in outwardly-spread, divergent state as shown in Fig. 3. I have found that by making the dimensions of the several parts in the proportions as shown in Fig. 3, the canopy will actually maintain its outwardly-spread, taut position throughout its movement through the air.

A practical, workable arrangement will be obtained by making the lower opening 31 into the canopy a circle of the diameter of $2a$, and equal to the diameter of the central line of the annulus, where $a$ is the diameter of the circle forming the cross-section of the annulus. It is understood, of course, that the specific proportions are not intended to limit the scope of my invention, as many other proportions will give arrangements in which the pressure of the air acting on the central opening of the hollow canopy will be sufficient to cause the outwardly bulging upper part of the hollow annulus to spread in outwardly and upwardly divergent directions necessary to give the parachute the high degree of stability.

The general appearance of the parachute of the form shown in Fig. 3, while in the course of descent is illustrated in Fig. 4.

In order to derive full advantage of the annular construction of the wingbody as shown in Fig. 3, it is important that the circular lines 32, 33, along which the walls 35, 36, are jointed to the annulus shall maintain the proper spacing corresponding to their positions as parallel circles on the periphery of the annulus 30. This may be effected without introducing any rigid members in the structure, by providing along the interior of the annulus, stays 51 in the form of cords or straps extending between points on the periphery of the annulus 30 and maintaining their proper spacing. Such stay cords 51 may, for instance, be made in the form of chords of the circular section of the annulus.

In order to prevent the shape of the canopy such as shown in Fig. 3, from being distorted by excessively pulling down the central cord 45, this cord may be provided with a knot or similar enlargement 52 on the point to be held just above the tie disk 22 so that the aviator is unable to pull this cord down to an extent sufficient to disturb the shape of the canopy.

In Fig. 7 the canopy part of the parachute such as shown in Fig. 3, is illustrated in inclined position, and the air pressure forces acting on such canopy are indicated by arrows 55, 56, 57. As seen from Fig. 7, irrespective of whether wind forces act on the inclined canopy from the right or from the left, there will always develop a stabilizing force indicated by the arrow 57, acting on the side of the canopy that has been tipped downwardly, and tending to straighten it out to its vertical position. Accordingly, a parachute having a canopy of such construction will not be subjected to the constant swinging or swaying movement present in the prior art parachutes, but will descend downwardly in straight, vertical direction; or will move in a uniform diagonal direction if the aviator has suitably displaced his weight by pulling on the loops 43 of the carrying strands 29 disposed on one or another side of the periphery of the canopy. As pointed out before, the aviator is also in a position to control the speed of descent and slow it down by releasing to a more or less extent the central cord 45 and permitting the apex 37 of the central cone portion of the upper wall of the canopy to be raised somewhat. With such a parachute, landing takes place gently without any swinging movement and the aviator or the load is not dragged along by the parachute, but the canopy drops down without exposing the aviator to any dangers.

When made in sufficiently large sizes, such parachutes may also be used for swayless lowering of large objects such as fully loaded cabins of large flying machines, or the flying machines themselves.

Many other forms of construction besides those shown in the figures described hereinbefore lend themselves to embodiment of my invention, and in Figs. 8 to 13, inclusive, I have shown a number of cross-sectional views through different forms of canopy structures designed to embody to a more or less extent, the advantageous features of the construction such as shown in the parachute of Fig. 3 described above.

In all of the structures shown in Figs. 8–13, inclusive, the canopies are made with an outwardly diverging wingbody, and as described before, one part of the canopy is formed by a segment of an annulus 61 of circular cross-section. In the arrangements of all of the figures except Fig. 13, the annulus has joined thereto along the circular sectional line on the inner side of the annulus, a central upper wall member 62 of substantially inverted conical shape. On the lower side there is joined to the annulus, a tubular inlet member 63, likewise along a circular line on the periphery of the annulus, although the latter wall portion may be omitted if desired. In all of these constructions the upper central conical wall portion 62 with the upper side of the annulus wall 61 form a rotary body of a V-shaped cross-section, and likewise the lower wall of the annulus with the adjacent central wall portion form such a rotary surface of a generally V-shaped, or upwardly divergent, cross-sectional outline.

In the form of construction shown in Fig. 13, the upper wall portion 61 of the canopy has a surface defined by the rotation of a circle segment around the central axis, thereby giving to the structure the same general V-shaped cross-sectional outline as in the structures described before. The lower wall side 63 is formed by a frustoconical inverted section joined to the upper wall along a circular line 64.

The principles underlying my invention are susceptible of embodiment in many other forms of construction which will suggest themselves to those skilled in the art, and it is accordingly desired that the appended claims be given a broad construction commensurate with the scope of the invention within the art.

I claim:

1. In a parachute apparatus, a canopy having an upwardly diverging hollow wingbody spreading outwardly toward opposite sides, the lower narrower side of said hollow wingbody having an opening of such size that on downward movement of the canopy the air pressure acting through said opening in the interior of said canopy will keep it in taut condition with the wingbody in the outwardly spread state, the upper side of said canopy having a central portion maintained below the midpoint of the height of the canopy.

2. In a parachute apparatus, a collapsible canopy of flexible fabric having an annular, upwardly diverging hollow wingbody, the upper surface of the canopy being substantially of the shape of an inverted cone, the lower outer surface of said wingbody being substantially of the shape of an inverted frustocone and having a wide central opening, the size of said opening being so proportioned that the pressure of air produced in the interior of the body by the downward movement of the canopy causes it to be inflated and maintained in outwardly and upwardly divergent condition, the central apex of said upper wall being maintained below the midpoint of the height of the canopy.

3. In a parachute apparatus, a collapsible canopy of flexible fabric having an annular, upwardly diverging hollow wingbody, the upper surface of the canopy being substantially the shape of an inverted cone, the lower outer surface of said wingbody being substantially of the shape of an inverted frustocone and having a wide central opening, the central apex of said upper wall being substantially at the level of said opening, the size of said opening being so proportioned that the pressure of air produced in the interior of the body by the downward movement of the canopy causes it to be inflated and maintained in outwardly and upwardly divergent condition.

4. In a parachute apparatus, a collapsible canopy of flexible fabric having an annular upwardly diverging hollow wingbody, the upper surface of the canopy being substantially of the shape of an inverted cone, the lower outer surface of said wingbody being substantially of the shape of an inverted frustocone and having a wide central opening, the size of said opening being so proportioned that the pressure of air produced in the interior of the body by the downward movement of the canopy causes it to be inflated and maintained in outwardly and upwardly divergent condition, a plurality of carrying strands connected to the periphery of the canopy along said opening, and a load suspended on said carrying strands, the central apex of said upper wall being maintained below the midpoint of the height of the canopy.

5. In a parachute apparatus, a collapsible canopy of flexible fabric having an annular upwardly diverging hollow wingbody, the upper surface of the canopy being substantially of the shape of an inverted cone, the lower outer surface of said wingbody being substantially of the shape of an inverted frustocone and having a wide central opening, the size of said opening being so proportioned that the pressure of air produced in the interior of the body by the downward movement of the canopy causes it to be inflated and maintained in outwardly and upwardly divergent condition, a plurality of carrying strands connected to the periphery of the canopy along said opening, a load suspended on said carrying strands, a central cord connecting the apex of the upper surface of the canopy to the said load and defining the position of said apex, and means for limiting the positions of said apex to points below the midpoint of the height of the canopy.

6. In a parachute apparatus, a collapsible canopy of flexible fabric having an annular upwardly diverging hollow wingbody, the upper surface of the canopy being substantially of the shape of an inverted cone, the lower outer surface of said wingbody being substantially of the shape of an inverted frustocone and having a wide central opening, the size of said opening being so proportioned that the pressure of air produced in the interior of the body by the downward movement of the canopy causes it to be inflated and maintained in outwardly and upwardly divergent condition, a plurality of carrying strands connected to the periphery of the canopy along said opening, a load suspended on said carrying strands, a connection between the apex of the upper surface of the canopy and the load, defining the position of said apex, and means for limiting the positions of said apex to points below the midpoint of the height of the canopy.

7. In a parachute apparatus, a collapsible canopy of flexible fabric having an annular hollow wingbody, the upper surface of the canopy being substantially of the shape of an inverted cone, the lower outer surface of said wingbody being substantially of the shape of an inverted frustocone and having a wide central opening, the size of said opening being so proportioned that the pressure of the air produced in the interior of the body by the downward movement of the canopy causes it to be inflated and maintained in outwardly and upwardly divergent condition, stay means extending between the portions adjacent the lower opening of the canopy and the portions at the upper side of the canopy to maintain the outer wingbody therein in inflated condition irrespective of the position of the central apex of the upper canopy wall, a plurality of carrying strands connected to the periphery of the canopy along said opening, a load suspended on said carrying strands, means on said load for varying the position of the apex of the upper canopy wall and means associated with said last named means for maintaining said apex below the midpoint of the height of the canopy.

In testimony whereof, I have hereunto subscribed my name, this 11th day of May, 1929.

WILLIAM M. MARTIN.